United States Patent Office 3,373,158
Patented Mar. 12, 1968

3,373,158
TETRAHYDRO-1,3,5-THIADIAZINE-2-THIONES
Manfred Schorr, Frankfurt am Main, Walter Dürckheimer, Hattersheim am Main, and Georg Lämmler, Frankfurt am Main, Germany, assignors to Farbwerke Hoechst Aktiengesellschaft vormals Meister Lucius & Brüning, Frankfurt am Main, Germany, a corporation of Germany
No Drawing. Filed Feb. 19, 1965, Ser. No. 434,126
Claims priority, application Germany, Feb. 20, 1964, F 42,061
10 Claims. (Cl. 260—243)

ABSTRACT OF THE DISCLOSURE

Tetrahydro-1,3,5-thiadiazine-2-thiones substituted in the 3-position by a halogen-substituted aralkyl and in the 5-position by lower alkyl, lower alkenyl or lower hydroxy alkyl. These compounds are good fungistatics and bacteriostatics, and are especially useful for the treatment of trematodes infections.

---

Various processes are already known for the preparation of tetrahydro-1,3,5-thiadiazine-2-thiones by the reaction of primary amines with hydrogen sulphide and an alkali metal and the subsequent reaction of formaldehyde and a further mol of a primary amine. In many cases the compounds thus obtained have an inhibiting action, especially in those cases where the tetrahydro-1,3,5-thiadiazine-2-thione ring in 3-position is substituted by a benzyl or phenylethyl radical, on the growth of various microorganisms. This effect is especially marked towards fungi (cf. A. Rieche, G. Hilgetag, A. Martin, O. Nededly and J. Schlegel, "Arch Pharmaz.," 293, 957 (1960)). Up to now it has, however, not yet been known whether the compounds mentioned above have an effect on trematodes.

The present invention is based on the observation that tetrahydro-1,3,5-thiadiazine-2-thiones of the formula

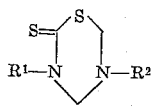

wherein $R^1$ is a halogen-substituted aralkyl radical and $R^2$ represents a lower alkyl, lower alkenyl or lower hydroxyalkyl radical, are obtained by converting a primary amine of the general formula $R^1$—$NH_2$ wherein $R^1$ has the meaning given above, in the presence of an alkali metal hydroxide or an alkaline earth metal hydroxide or carbonate, by the action of hydrogen sulphide into the corresponding dithiocarbamic acid salt and then reacting thereon formaldehyde and the salt of an amine of the general formula $R^2$—$NH_2$ wherein $R^2$ has the meaning given above. The products thus obtained are especially useful for the treatment of trematodes infections.

As halogen-aryl-alkyl-amines of the formula $R^1$—$NH_2$ there are preferably used benzyl or β-phenylethyl-amines the benzene nucleus of which is substituted by one or more halogen atoms. In addition, there may be used compounds having a long or a branched alkyl chain such as halogen substituted phenylpropyl-amines or phenylbutyl-amines. In accordance with the invention there may also be used as starting material an amine whose alkyl chain has several halogen-phenyl radicals. As suitable halogen atoms through which the benzene nuclei of the aralkylamines mentioned above are substituted there come into consideration above all fluorine, chlorine and bromine, chlorine, however, being preferred. The following amines may, for example, be used for the reaction:

4-chlorobenzylamine, 3,4-, 3,5- or 2,5-dichlorobenzyl-amine, 4 - bromobenzylamine, 4 - fluorophenyl-ethyl-amine, 3,4- or 2,4-dichlorophenyl-ethylamine, 4-chlorophenyl-propylamine, 4-chlorophenyl-butylamine, 4-chloro-α-ethylbenzylamine, 3,3 - bis-(4 - chlorophenyl)-propyl-amine, 2,3-bis-(4-chlorophenyl)-propylamine, 3,4-bis-(4-chlorophenyl)-butylamine, 2,3-bis-(4-chlorophenyl)-pentylamine.

Further starting materials are the amines of the general formula $R^2$—$NH_2$ wherein $R^2$ represents an alkyl group having 1–6 carbon atoms, which group may also contain a double bond or may be substituted by one or several hydroxyl groups. Among these substances the hydroxyalkylamines are preferred. As examples there may be named the following compounds: methylamine, ethylamine, ethanolamine, isopropyl-amine, 3-aminopropanol, 3-amino-1,2-propanediol, butylamine, 4-amino-butanol, allylamine, amylamine, hexylamine.

The process of the present invention is carried out as follows:

The corresponding dithiocarbamate is first prepared by reacting a halogen-substituted aralkyl-amine with hydrogen sulphide and an alkali metal. The reaction components may be used in molar portions. The hydroxides or carbonates of alkali metals or alkaline earth metals may be applied and sodium hydroxide or potassium hydroxide have been found to be particularly useful. Advantageously, the process may be caried out as follows: Aralkylamine is first mixed with hydrogen sulphide in the presence of a solvent, and an aqueous or alcoholic sodium hydroxide solution is then added. As solvents there come into consideration: water or polar organic solvents, for example, methanol, ethanol, acetone, dioxane, tetrahydrofurane or acetonitrile.

It is not necessary to isolate the salts of dithiocarbamic acid obtained in the form of pure substances. Advantageously, they are at once further reacted in solution by adding at least 2 mols of formaldehyde, preferably in the form of an aqueous solution, and at least 1 mol of a neutral salt of an alkylamine or hydroxy-alkylamine. As acid components of the salt of the amine inorganic or organic acids may be used. The salts with hydrohalic acids, sulphuric acid, amido-sulphonic acid, phosphoric acid, acetic acid, propionic acid and others, for example, have been found useful. The hydrochlorides are advantageously applied. The reaction may be carried out at a slightly reduced or slightly raised temperature, the preferred method being to operate at room temperature. The salts of the amine are advantageously added in the dissolved state to the reaction mixture. When all the components have been mixed, the tetrahydro-1,3,5-thiadiazine-2-thiones, as a rule, rapidly precipitate from the reaction mixture. Sometimes, they are obtained in the form of an oil. They crystallise after a short time or on rubbing with a suitable solvent and can then be isolated by filtration. In most cases the products thus obtained are substantially pure and the yields generally amount to 80–100%. In some cases it may be advisable to carry out a further purification by recrystallisation. For this purpose ethyl acetate is especially useful as a solvent. If for solubility's sake it is necessary to use an alcohol, there has to be operated as rapidly as possible because tetrahydro-1,3,5-thiadiazine-2-thiones have the tendency to decompose on heating with water or organic solvents containing hydroxyl groups, this causing a considerable reduction of the yield. In the solid form they constitute colourless crystalline powders which can be stored for any length of time. Decomposition sets in only above the melting point.

The tetrahydro-1,3,5-thiadiazine-2-thiones obtained by the process of the present invention may be used as medicaments. Just as the already known compounds of this class of substances they are good fungistatics and bacteriostatics.

The following table illustrates the excellent inhibiting effect of some of the compounds of the present invention:

TABLE

[Bacteriostatic and fungistatic action of some of the 1,3,5-tetrahydro-thiadiazine-2-thiones: (the concentrations given in γ/cc. were sufficient completely to inhibit the growth of the bacteria and fungi enumerated)]

| | Staph. aur. | Strept. hemol. | Enteroc. faecium | Protens vulgaris | E. coli | Microsporum gypseum | Microsporum camis | Trichophyton rubrum | Trichophyton tonsurans | Candida albicans 504 |
|---|---|---|---|---|---|---|---|---|---|---|
| 3-(4-chlorobenzyl)-5-(β-hydroxy-ethyl)-tetrahydro-1,3,5-thiadiazine-2-thione | 1.5 | 6 | 30 | 8 | 60 | 4 | 2 | 4 | 2 | 31 |
| 3-(3,4-dichlorobenzyl)-5-(γ-hydroxypropyl)-tetrahydro-1,3,5-thiadiazine-2-thione | 0.8 | 6.25 | 62.5 | 31.5 | 62.5 | 4 | 2 | 2 | 1 | 16 |
| 3-(β-4-chlorophenylethyl)-5-n-butyl-tetrahydro-1,3,5-thiadiazine-2-thione | | | | | | <−0.5 | <0.5 | <0.5 | <0.5 | 16 |
| 3-(β-4-chlorophenylethyl)-5-(β-hydroxy-ethyl)-tetrahydro-1,3,5-thiadiazine-2-thione | 2 | 7.8 | 62.5 | 7.8 | 12.50 | 2 | 4 | 2 | 2 | 31 |
| 3-(β-3,4-dichlorophenylethyl)-5-(β-hydroxy-ethyl)-tetrahydro-1,3,5-thiadiazine-2-thione | 7.8 | 3.5 | 12.5 | | | 1 | 1 | 1 | <0.5 | 31 |

In addition, the products obtained by the process of the present invention show a strong anthelmintic action particularly on the various kinds of leeches. Especially striking is their action on *Opisthorchis felineus*. A considerable importance must be attributed to the infestment of domestic animals in many countries all over the earth with liver fluke. Efficacious medicaments for combating *Fasciola hepatica* and *Dicrocolium dendriticum* are already known and administered on a large scale in veterinary practice, whereas up to now there does not exist any specifically active chemo-therapeutic preparation for combating the various kinds of Opisthorchis (*Opisthorchis felineus, Opisthorchis viveroini, Opisthorchis sinensis*).

The chemo-therapeutic investigations were carried out for experimental purposes on golden hamsters infected with *Opisthorchis felineus*. The tested compounds were orally administered to the animals on the whole thrice on consecutive days. The success of the treatment was ascertained by examination of the faeces with the aid of the Telemann-process prior to the treatment and by two further examinations on the fourteenth and twentieth day after the treatment and by a post-mortem examination of the animals. As dosis curativa minima was regarded the dose after the third administration of which the infestment with *Opisthorchis felineus* had been overcome. The following table illustrates the values found in the golden hamster test with regard to some of the products obtained by the process of the present invention. Moreover, some compounds described in Arch. Pharm., 293, 957 (1960) and comparable with the products of the present invention as regards their structure are enumerated; said compounds, however, do not show any action on *Opisthorchis felineus*. The introduction of halogen into the aralkyl radical thus causes, and this being surprising, an entirely new biological effect. This could hardly be expected because among the water-soluble 3-aralkyl-tetrahydro-1,3,5-thiadiazine-2-thiones, as they are described by A. Rieche, D. Martin and W. Schade in Arch. Pharm., 296, 770 (1963), the fungistatic efficiency of the compounds considerably decreases by the introduction of substituents into the aromatic ring.

TABLE

| Substance | Dosis curativa minima in mg./kg. of body weight per os |
|---|---|
| 3-(4-chlorobenzyl)-5-n-butyl-tetrahydro-1,3,5-thiadiazine-2-thione. | 3× 200 |
| 3-(4-fluorophenylethyl)-5-(β-hydroxy-ethyl)-tetrahydro-1,3,5-thiadiazine-2-thione. | 3× 100 |
| 3-(3,4-dichlorobenzyl)-5-(γ-hydroxy-propyl)-tetrahydro-1,3,5-thiadiazine-2-thione. | 3× 100 |
| 3-[γ,γ-bis-(4-chlorophenyl)-propyl]-5-(βhydroxy-ethyl)-tetrahydro-1,3,5-thiadiazine-2-thione. | 3× 200 |
| 3-benzyl-5-(β-hydroxy-ethyl)-tetrahydro-1,3,5-thiadiazine-2-thione. | (¹) |
| 3-benzyl-5-propyl-tetrahydro-1,3,5-thiadiazine-2-thione. | (¹) |
| 3-phenylethyl-5-isopropyl-tetrahydro-1,3,5-thiadiazine-2-thione. | (¹) |

¹ Inactive.

For combating parasites the products of the present invention are orally administered, either as such or in the form of galenic preparations, for example, tablets, capsules, dragees, juices or the like with admixture of pharmacologically tolerable carriers such as talc, starch, lactose, tragacanth, magnesium stearate and others. The quantity per unit to be administered preferably amounts to 50–500 mg.

For combating bacteria and fungi the products may be administered in the form of a jelly, powder, ointment, paste, shaking mixture, tincture, solution or suspension with admixture of pharmacologically tolerable carriers. The active substances may be added to the galenic preparations in a concentration of 0.5 to 10%, preferably 2 to 3%.

The following examples illustrate the invention:

EXAMPLE 1

*3-(4-chlorophenylethyl)-5-(β-hydroxy-ethyl)-tetrahydro-1,3,5-thiadiazine-2-thione*

31.1 grams of 4-chlorophenylethylamine are dissolved in 100 cc. of acetonitrile, and 12.1 cc. of hydrogen sulphide and 0.2 mol of sodium hydroxide solution of 10% strength are dropwise added to the solution at 20° C., while stirring.

A solution of sodium-4-chlorophenylethyl-dithiocarbamate is obtained to which, after 30 minutes, first 30 cc. of formaldehyde solution of 40% strength and then 12.1 grams of ethanolamine in 100 cc. of 2 N-hydrochloric acid are added. The 3-(4-chlorophenylethyl)-5-(β-hydroxy-ethyl)-tetrahydro-1,3,5 - thiadiazine - 2 - thione immediately precipitates in the form of an oil and crystallises on rubbing. It can be recrystallised from ethyl acetate/petroleum ether. It melts at 88–89° C.

EXAMPLE 2

*3-(4-fluorophenylethyl)-5-(β-hydroxy-ethyl)-tetrahydro-1,3,5-thiadiazine-2-thione*

27.8 grams of 4-flurophenylethylamine are dissolved in 100 cc. of acetonitrile, and 12.1 cc. of hydrogen sulphide and 0.2 mol of sodium hydroxide solution of 10% strength are dropwise added to the solution at 20° C., while stirring. After 30 minutes there are added first 30 cc. of formaldehyde solution of 40% strength and then 12.2 grams of ethanolamine in 100 cc. of 2 N-hydrochloric acid. An oil precipitates which rapidly crystallises. By recrystallisation from ethyl acetate the 3-(4-fluorophenylethyl) - 5 - (β-hydroxyethyl) - tetrahydro - 1,3,5 - thiadiazine-2-thione may be purified. The product melts at 97–99° C.

EXAMPLE 3

*3-[γ,γ-bis-(4-chlorophenyl)-propyl]-5-(β-hydroxy-ethyl)-tetrahydro-1,3,5-thiadiazine-2-thione*

53.2 grams of γ,γ-di-(4-chlorophenyl)-propylamine are dissolved in 200 cc. of acetonitrile, and 12.1 cc. of hydrogen sulphide and 0.2 mol of sodium hydroxide solution of 10% strength are dropwise added to the solution at 20° C., while stirring. After 30 minutes there are first added 30 cc. of formaldehyde solution of 40% strength and then 12.2 grams of ethanolamine in 100 cc. of 2N-hydrocholoric acid. The 3-[γ,γ-bis-(4-chlorophenyl)-propyl] - 5 - (β-hydroxy-ethyl) - tetrahydro - 1,3,5 - thiadiazine-2-thione precipitates in the form of an oil which partially crystallises after standing for several days. There is digested with ether and the colourless crystals are filtered with suction. They can be purified by recrystallisation from ethyl acetate. The product melts at 128–129° C.

EXAMPLE 4

*3-(3,4-dichlorobenzyl)-5-(γ-hydroxy-propyl)-tetrahydro-1,3,5-thiadiazine-2-thione*

35.2 grams of 3,4-dichlorobenzylamine are dissolved in 100 cc. of acetonitrile, and 12.1 cc. of hydrogen sulphide and 0.2 mol of a sodium hydroxide solution of 10% strength are dropwise added to the solution at 20° C., while stirring. After 30 minutes there are first added 30 cc. of formaldehyde solution of 40% strength and then 15 grams of 3-aminopropanol in 100 cc. of 2 N-hydrochloric acid. The oil which precipitates is dissolved in ethyl acetate, dried and filtered through a short column of aluminium oxide. On cooling to —20° C. the 3-(3,4-dichlorobenzyl) - 5 - (γ-hydroxypropyl) - tetrahydro-1,3,5-thiadiazine-2-thione separates in the form of colourless crystals which melt at 118° C.

EXAMPLE 5

*3-(4-fluorobenzyl)-5-(γ-hydroxy-propyl)-tetrahydro-1,3,5-thiadiazine-2-thione*

25 grams of 4-fluorobenzylamine are dissolved in 100 cc. of acetonitrile, and 12.1 cc. of hydrogen sulphide and 0.2 mol of sodium hydroxide solution of 10% strength are dropwise added to the solution at 20° C., while stirring. After 30 minutes there are added first 30 cc. of formaldehyde solution of 40 percent strength and then 15 grams of 3-amino-propanol in 100 cc. of 2 N-hydrochloric acid. The oil which precipitates solidifies on cooling and rubbing. By recrystallisation from ethyl acetate the 3-(4-fluorobenzyl) - 5 - (γ-hydroxy-propyl) - tetrahydro - 1,3,5-thiadiazine-2-thione can be further purified. The product melts at 121° C.

EXAMPLE 6

*3-(3,4-dichlorophenylethyl)-5-(β-hydroxy-ethyl)-tetrahydro-1,3,5-thiadiazine-2-thione*

38 grams of 3,4-dichlorophenylethyl-amine are dissolved in 100 cc. of acetonitrile, and 12.1 cc. of hydrogen sulphide, and 0.2 mol of sodium hydroxide solution of 10% strength are dropwise added at 20° C., while stirring. After 30 minutes there are added first 30 cc. of formaldehyde solution of 40% strength and then 12.2 grams of ethanolamine in 100 cc. of 2 N-hydrochloric acid. The 3-3(3,4-dichlorophenylethyl)-5-(β-hydroxy-ethyl)-tetrahydro-1,3,5-thiadiazine-2-thione precipitates in the form of an oil which crystallises on rubbing. It can be further purified by recrystallisation from ethyl acetate. The product melts at 125–126° C.

EXAMPLE 7

*3-(4-chlorobenzyl)-5-n-butyl-tetrahydro-1,3,5-thiadiazine-2-thione*

28.3 grams of 4-chlorobenzyl-amine are dissolved in 100 cc. of acetonitrile, and 12.1 cc. of hydrogen sulphide and 0.2 mol of sodium hydroxide solution of 10% strength are dropwise added at 20° C. while stirring. To the solution of sodium-4-chlorophenyl-dithiocarbamate thus formed there are added after 30 minutes first 30 cc. of formaldehyde solution of 40% strength and then 14.6 grams of n-butylamine in 100 cc. of 2 N-hydrochloric acid. An oil precipitates which crystallises on cooling and rubbing. The 3-(4-chlorobenzyl)-5-n-butyl-tetrahydro-1,3,5-thiadiazine-2-thione can be further purified by recrystallisation from ethyl acetate. The product melts at 110–111° C.

EXAMPLE 8

*3-(4-chlorobenzyl)-5-(β-hydroxy-ethyl)-tetrahydro-1,3,5-thiadiazine-2-thione*

4-chlorobenzyl-dithiocarbamate is prepared by the process described in Example 7. To the solution there are added first 30 cc. of formaldehyde solution of 40% strength and then 12.2 grams of ethanolamine in 100 cc. of 2 N-hydrochloric acid, during which operation the reaction product precipitates in the form of an oil. The 3 - (4 - chlorobenzyl) - 5 - (β - hydroxy - ethyl) - tetrahydro - 1,3,5 - thiadiazine - 2 - thione crystallises on cooling and rubbing. It can be purified by recrystallisation from ethyl acetate. The product melts at 93–94° C.

EXAMPLE 9

*3-(4-chlorophenylethyl)-5-n-hexyl-tetrahydro-1,3,5-thiadiazine-2-thione*

4-chlrophenylethyl-dithiocarbamate is prepared by the process described in Example 1. To the solution thus obtained there are added first 30 cc. of formaldehyde solution of 40% strength and then 20.2 grams of n-hexylamine in 100 cc. of 2 N-hydrochloric acid. The oil which precipitates is separated by decanting. On rubbing with methanol crystals of 3-(4-chlorophenylethyl)-5-n-hexyl-tetrahydro-1,3,5-thiadiazine-2-thione are obtained. They are dissolved and allowed to crystallise first from methanol and then from ether, while low cooling. The product melts at 72° C.

EXAMPLE 10

*3-(4-chlorophenylethyl)-5-methyl-tetrahydro-1,3,5 thiadiazine-2-thione*

A solution of sodium-4-chlorophenylethyl-dithiocarbamate is prepared by the process described in Example 1. There are added thereto first 30 cc. of formaldehyde solution of 40% strength and then 6.2 grams of ethylamine in 100 cc. of 2 N-hydrochloric acid, during which operation the 3 - (4 - chlorophenylethyl)-5-methyl-tetrahydro-1,3,5-thiadiazine-2-thione precipitates in the form of an oil and crystallises rapidly. If necessary, the product is purified by recrystallising it from ethylacetate. It melts at 123° C.

EXAMPLE 11

*3-(4-chlorophenylethyl)-5-allyl-tetrahydro-1,3,5 thiadiazine-2-thione*

4-chlorophenylethyl-dithiocarbamate is prepared as described in Example 1. There are added to the solution first 30 cc. of formaldehyde-solution of 40% strength and then 11.4 grams of allylamine in 100 cc. of 2 N-hydrochloric acid, during which operation the 3-(4-chlorophenylethyl) - 5 - allyl - tetrahydro-1,3,5-thiadiazine-2-thione precipitates in the form of an oil and crystallises on cooling and rubbing. The product may be further purified by recrystallisation from ethyl acetate. It melts at 143° C.

EXAMPLE 12

*3-(4-chlorophenylethyl)-5-i-butyl-tetrahydro-1,3,5-thiadiazine-2-thione*

The sodium 4-chlorophenylethyl-dithiocarbamate is obtained by the process described in Example 1. To the solution of the salt obtained there are added first 30 cc. of formaldehyde solution of 40% strength and then 14.6 grams of i-butylamine in 100 cc. of 2 N-hydrochloric acid. The 3-(4-chlorophenylethyl)-5-i-butyltetrahydro-1,3,5-thiadiazine-2-thione precipitates in the form of an oil and crystallises on cooling and rubbing. The product can be further purified by recrystallisation from ethyl acetate. It melts at 84–85° C.

EXAMPLE 13

*3-(2,4-dichlorophenylethyl)-5-(β-hydroxy-ethyl)-tetrahydro-1,3,5-thiadiazine-2-thione*

38 grams of 2,4-dichlorophenylethylamine are dissolved in 100 cc. of acetonitrile, and 12.1 cc. of hydrogen sulphide and 0.2 mol of sodium hydroxide solution of 10% strength are dropwise added to the solution at 20° C, while stirring. After 30 minutes there are added to the solution of the 2,4-dichlorophenylethyl-dithiocarbamate formed first 30 cc. of formaldehyde solution of 40% strength and then 12,2 g. of ethanolamine in 100 cc. of 2 N-hydrochloride acid. The oil which precipitates solidifies on cooling and rubbing. The 3-(2,4-dichlorophenylethyl) - 5 - (β - hydroxy - ethyl)-tetrahydro-1,3,5-thiadiazine-2-thione can be further purified by recrystallisation from ethyl acetate. It melts at 137° C.

We claim:
1. A compound of he formula

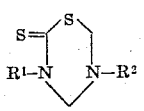

wherein $R^1$ is halosubstituted lower aralkyl and $R^2$ is lower alkyl, lower alkenyl or lower hydroxyalkyl.

2. 3 - (4 - chlorobenzyl) - 5-n-butyl-tetrahydro-1,3,5-thiadiazine-2-thione.
3. 3 - (4 - fluorophenylethyl) - 5 - (β-hydroxyethyl)-tetrahydro-1,3,5-thiadiazine-2-thione.
4. 3 - (3,4 - dichlorobenzyl) - 5(γ - hydroxy-propyl)-tetrahydro-1,3,5-thiadiazine-2-thione.
5. 3 - (3,4 - dichlorophenylethyl)-5-(β-hydroxyethyl)-tetrahydro-1,3,5-thiadiazine-2-thione.
6. 3 - [γ,γ - bis - (4 - chlorophenyl)-propyl]-5-(β-hydroxyethyl)-tetrahydro-1,3,5-thiadiazine-2-thione.
7. 3 - (4 - chlorophenylethyl) - 5 - (β-hydroxy-ethyl)-tetrahydro-1,3,5-thiadiazine-2-thione.
8. 3 - (4 - chlorobenzyl) - 5-(β-hydroxy-ethyl)-tetrahydro-1,3,5-thiadiazine-2-thione.
9. 3 - (4 - chlorophenylethyl)-5-allyl-tetrahydro-1,3,5-thiadiazine-2-thione.
10. 3 - (2,4-dichlorophenylethyl)-5-(β-hydroxy-ethyl)-tetrahydro-1,3,5-thiadiazine-2-thione.

References Cited

UNITED STATES PATENTS

| 2,838,389 | 6/1958 | Yoder | 260—243 |
| 3,085,046 | 4/1963 | Cummins | 260—243 |

FOREIGN PATENTS

| 232,707 | 2/1959 | Australia. |
| 1,149,014 | 2/1964 | Germany. |

OTHER REFERENCES

Rieche et al.: Archiv Pharmazie, vol. 293, pp. 957–67 (1960).

Shah et al., J. Indian Chem. Soc., vol. 41, pp. 225–7 (1964).

NORMA S. MILESTONE, *Acting Primary Examiner.*

J. M. FORD, *Assistant Examiner.*